US005947633A

United States Patent [19]

Foss

[11] Patent Number: 5,947,633

[45] Date of Patent: Sep. 7, 1999

[54] ADJUSTABLE COVER REMOVING AND INSTALLING TOOL

[76] Inventor: Milton K. Foss, 81 W. Vancouver Dr., Port Townsend, Wash. 98368

[21] Appl. No.: 09/038,536

[22] Filed: Mar. 11, 1998

[51] Int. Cl.[6] .............................. E02D 29/14; B66F 3/00; B65G 7/12

[52] U.S. Cl. ............................... 404/25; 254/130; 294/17

[58] Field of Search .............................. 404/25; 414/457; 294/15, 17; 254/130, 120, 129

[56] References Cited

U.S. PATENT DOCUMENTS

| | | | |
|---|---|---|---|
| 125,784 | 4/1872 | Bodge | 254/120 |
| 147,046 | 2/1874 | Crosby | 254/120 |
| 353,366 | 11/1886 | McNabb | 254/120 |
| 465,837 | 12/1891 | Critcher | 254/120 |
| 974,049 | 10/1910 | Gaddis | 254/120 |
| 1,819,445 | 5/1931 | Soeffker | 254/120 |
| 1,870,097 | 8/1932 | Coller | 414/457 |
| 1,870,163 | 8/1932 | Behling | 414/457 |
| 2,086,318 | 7/1937 | Jackson | 294/15 |
| 2,417,644 | 3/1947 | Graham | 414/457 |
| 2,832,678 | 4/1958 | Turnbull | 294/15 |
| 2,846,259 | 8/1958 | Sadler | 294/15 |
| 4,114,771 | 9/1978 | Heuckroth | 414/457 |
| 4,365,925 | 12/1982 | Gritz | 414/684.3 |
| 4,482,182 | 11/1984 | Mortensen | 294/15 |
| 4,991,893 | 2/1991 | Gordon | 294/17 |
| 5,004,282 | 4/1991 | Perry | 294/16 |
| 5,462,385 | 10/1995 | Mohlengraft | 404/25 |

*Primary Examiner*—James A. Lisehora
*Assistant Examiner*—Gary S. Hartmann
*Attorney, Agent, or Firm*—Dean A. Craine

[57] ABSTRACT

A hand-operated tool for removing and installing manhole covers or similar item is disclosed. The tool comprises two leg members, each pivotally connected at their upper ends to the opposite ends of a crossmember. Attached at approximately the mid-point of each leg member is a horizontally aligned chain designed to limit the distance the leg members can be spread apart during operation. A second chain is attached at one end to approximately the mid-point of the cross-member. During operation, the second chain hangs vertically from the crossmember. A hook is attached to the opposite end of the hook which either directly engages the edge of the cover or a lifting element attached to the cover. The chain is adjustable in length so that the leg members may be spread apart on opposite sides of the cover. During use, the second chain is attached to the cover and the tool is moved to one side which lifts and moves the cover to the desired position. The same movement is used to install the cover.

1 Claim, 1 Drawing Sheet

ADJUSTABLE COVER REMOVING AND INSTALLING TOOL

BACKGROUND OF THE INVENTION

1. Field of the Invention:

This invention relates to a hand tool and, more particularly, to hand tools used to remove and install manhole covers or other similar objects.

2. Description of the Related Art:

Hand tools used to manually lift manhole covers are common. One of their drawbacks is that they must be used on relatively flat surfaces. Another drawback is that there must be sufficient space located adjacent to the cover to operate the tool. If there is not sufficient space or if the adjacent area to the cover is uneven or sloped, such tools can not be used.

What is needed is a hand tool for removing and installing a manhole cover or the like that can be used when there is limited or no flat space adjacent to the cover.

SUMMARY OF THE INVENTION

It is a general object of the present invention to provide a hand-operated tool for removing and installing a manhole cover or the like.

It is another object of the present invention to provide such a tool that can be used when there is limited or no flat space located adjacent to the cover.

These and other objects of the invention are met by providing a hand-operated tool for removing and installing manhole covers and the like. The tool comprises two leg members, each pivotally connected at their upper ends to the opposite ends of a crossmember. The leg members are able to pivot in a direction parallel to the crossmember's longitudinal axis. Attached at approximately the mid-point of each leg member is a limiting member designed to limit the distance the ends of the legs can be spread apart during operation. A chain is attached at one end to approximately the mid-point of the crossmember. During operation, the chain hangs vertically from the cross-member. A hook is attached to the opposite end of the chain which either directly engages the edge of the cover or a cover attachment means lifting element attached to the cover. A hook is attached to the crossmember which acts as a length adjustment means so that the chain is pulled tightly between the crossmember and the cover. During operation, the chain is adjustable in length so that the legs may be spread apart at different distances or on curved surfaces on opposite sides of the cover. When the chain is attached to the cover, the tool is forced laterally so that the tool's central axis is moved to one side which lifts and moves the cover to the desired position. The movement of the tool is reversed to install the cover over the manhole.

DESCRIPTION OF THE PREFERRED EMBODIMENT(S)

Figure 1:
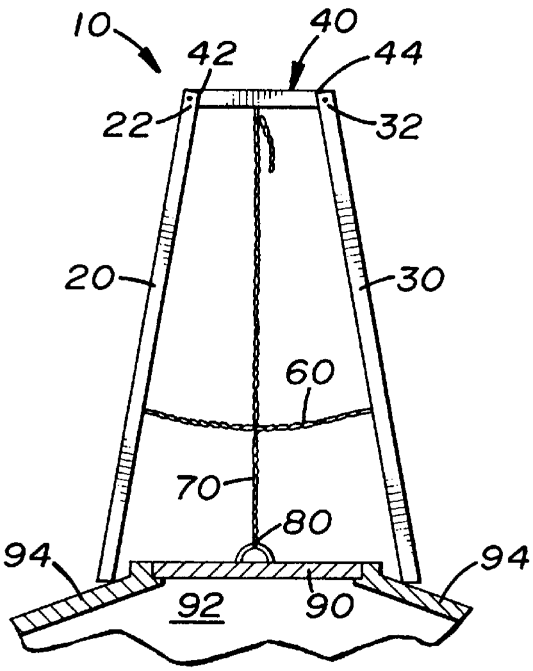
FIG. 1 is a side elevational view of the hand-operated tool used to remove a cover from a sewer treatment holding tank.
Figure 2:
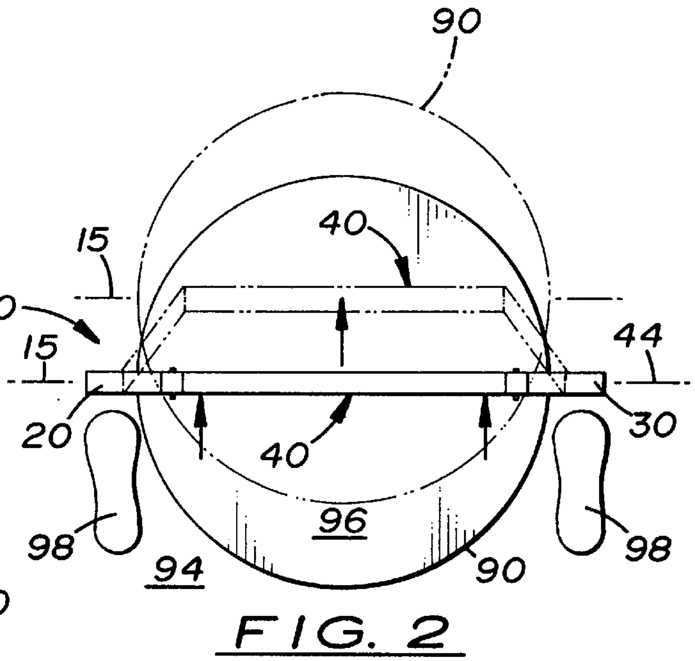
FIG. 2 is a top plan view of the tool shown in FIG. 1.
Figure 3:
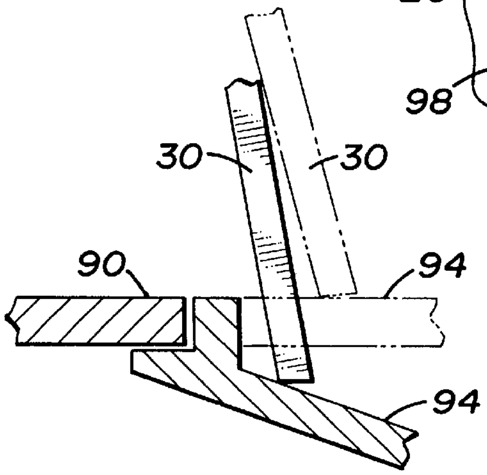
FIG. 3 is a side elevational view showing how the legs and second chain member can be adjusted to accommodate different adjacent surfaces.

As shown in the accompanying FIGS. 1–3, a hand-operated tool 10 is described for removing and installing manhole covers and the like. The tool 10 comprises two leg members 20, 30, each pivotally connected at their upper ends 22, 32 to the opposite ends 42, 44 respectively of a crossmember 40. Attached at approximately the mid-point of each leg 20, 30 is a horizontally aligned chain 60 designed to limit the distance the leg members 20, 30 can be spread apart during operation. A second chain 70 is attached to approximately the mid-point of the crossmember 40. During operation, the second chain 70 hangs vertically from the cross-member 40. A hook 80 is attached to the opposite end of the second chain 70 which either directly engages the edge of the cover 90 or a lifting element attached to the cover 90. The second chain 70 is adjustable in length so that the leg members 20, 30 may be rotated in a direction parallel to the longitudinal axis 44 of the cross member 40 to allow the leg members 20, 30 to spread apart a desired distance on opposite sides of the cover 90.

During use, the second chain 70 is attached to the cover 90 and the tool 10 is moved laterally (see arrow) which lifts and moves the cover 90 to the desired position, as shown in FIG. 2. Typically, the user 98 will stand in front of the tool 10 and apply a rearward force causing the tool's mid-line axis 15 to move. As the mid-line axis 15 is moved, the second chain 70 lifts and moves the cover 90. The same movement is used to install the cover 90.

As shown in FIG. 3, the pivotal leg members 20, 30, chains 60 and 70, enable the tool 10 to be used on adjacent surface 94 which are sloped or flat. Since the pulling action of the tool 10 is located directly over the cover 90, minimal space is required around the cover 90.

In compliance with the statute, the invention, described herein, has been described in language more or less specific as to structural features. It should be understood, however, the invention is not limited to the specific features shown, since the means and construction shown comprised only the preferred embodiments for putting the invention into effect.

The invention is, therefore, claimed in any of its forms or modifications within the legitimate and valid scope of the amended claims, appropriately interpreted in accordance with the doctrine of equivalents.

I claim:

1. An adjustable cover removing and installing tool, comprising:

a. a cross member, said cross member having two opposite ends and a longitudinal axis;

b. two leg members each being pivotally attached to one said opposite end of said cross member, each said leg member capable of rotating in a direction parallel to said longitudinal axis of said cross member;

c. a limiting member attached between said leg members to limit the amount of rotation of one said leg members relative to the other said leg member;

d. a chain attached at one end to said cross member;

e. a cover attachment means attached to the opposite end of said chain enabling said chain member to be selectively attached to a cover and;

f. a chain length adjustment means to enable said cover attachment means to be attached to a cover and enable said chain to be adjusted in length so that when a lateral force is applied to said cross member perpendicularly to said longitudinal axis of said cross member, a cover attached to said cover attachment means may be lifted.

* * * * *